Feb. 16, 1937.  H. J. DICK, JR  2,070,826
DISH RACK
Filed April 14, 1936   2 Sheets-Sheet 1

Inventor
H. J. Dick, Jr.
By Clarence A. O'Brien and
Hyman Berman
Attorneys

Feb. 16, 1937. H. J. DICK, JR 2,070,826
DISH RACK
Filed April 14, 1936 2 Sheets-Sheet 2

Inventor
H. J. Dick, Jr.

By Clarence A. O'Brien and
Hyman Berman
Attorneys

Patented Feb. 16, 1937

2,070,826

UNITED STATES PATENT OFFICE 2,070,826

DISH RACK

Herman J. Dick, Jr., Shamokin, Pa.

Application April 14, 1936, Serial No. 74,350

1 Claim. (Cl. 211—41)

The present invention relates to a dish rack and has for its prime object to provide means whereby dishes may be racked in a compact and convenient manner for drying purposes and the like.

Another important object of the invention resides in the provision of a rack of this nature which is foldable, compact and convenient in its construction and arrangement of parts, easy to manipulate, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1:
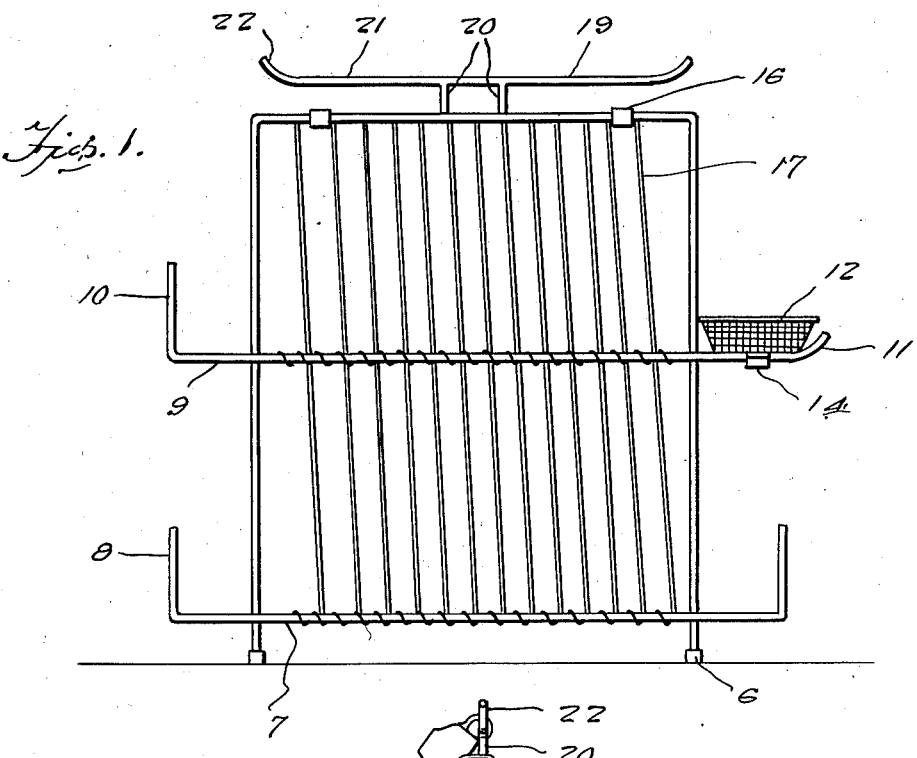
Figure 1 is a side elevation of a rack embodying the features of my invention.

Referring to the drawings it will be seen that we have two substantially inverted U-shaped frame members 5 with feet 6 on the terminals thereof. Across the legs adjacent the feet are mounted rods 7 extending outwardly beyond the legs and terminating in upwardly disposed elements 8. Rods 9 are secured across the legs of the frame intermediate their ends and at adjacent ends are provided with upstanding extensions 10 and at the other ends with curved upwardly disposed terminals 11. A basket or perforated tray 12 has sleeves 14 on the bottom thereof engaged over and under elements 9 as shown to advantage in Figure 2. The bight or cross portions of the frames are connected by loop members 16. Partitions are provided in the frames by rod members 17, disposed in spaced parallelism and curved about the rods 9. A rack 19 is provided on the cross portion of one of the frames and comprises a pair of uprights 20 and a cross member 21 with upwardly disposed terminals 22.

Figure 2:
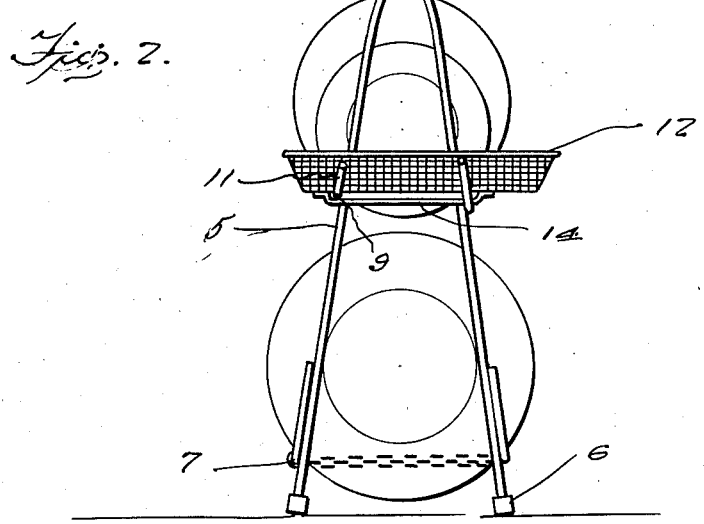
Figure 2 is an end elevation thereof.
Figure 3:
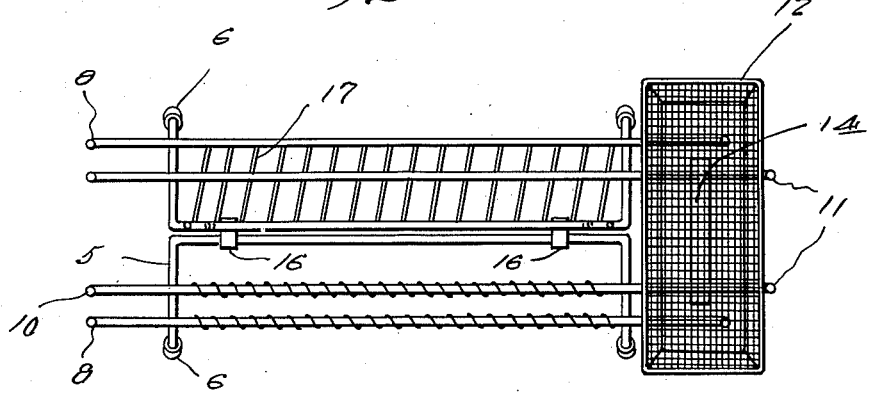
Figure 3 is a vertical horizontal section taken substantially on the line 3—3 of Figure 1.
Figure 4:
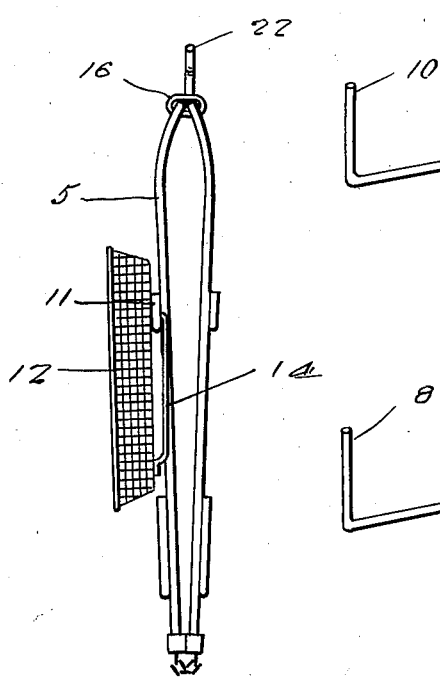
Figure 4 is an end elevation showing the apparatus folded.
Figure 5:
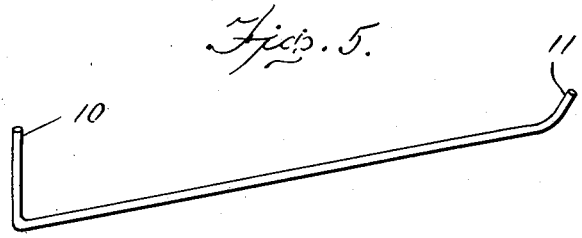
Figure 5 is a perspective view of one of the upper rods.
Figure 6:
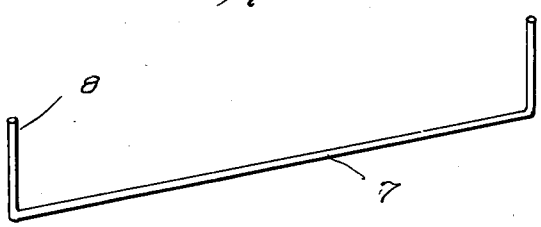
Figure 6 is a perspective view of one of the lower rods.

From the above detailed description it will be readily seen that the dishes may be dried in the frame when disposed as shown in Figure 2 with the dishes between the elements 17, and the whole apparatus may be folded to the position shown in Figure 4 when not in use.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

A device of the class described comprising a pair of frames of substantially inverted U-shaped formation, means swingably connecting the upper ends of the frames together, the lower ends of the frames being movable toward each other into a collapsed position, partition means provided in the frames, a tray, and means for supporting the tray on the frames, said means including a pair of parallel rods on which the tray is supported in bridging position when the frames are in their open position, one of said rods freely supporting the tray and the other rod being swingably connected to the tray to provide for the movement of the tray parallel to the frames when the latter are collapsed.

HERMAN J. DICK, Jr.